(12) United States Patent
Laird et al.

(10) Patent No.: US 9,091,254 B2
(45) Date of Patent: Jul. 28, 2015

(54) FLUID WORKING MACHINE AND METHOD OF OPERATING A FLUID WORKING MACHINE

(75) Inventors: Stephen Michael Laird, Edinburgh (GB); Daniil Sergeevich Dumnov, Edinburgh (GB); Michael Richard Fielding, Edinburgh (GB); Niall James Caldwell, Edinburgh (GB)

(73) Assignee: ARTEMIS INTELLIGENT POWER LIMITED, Loanhead (GB)

( * ) Notice: Subject to any disclaimer, the term of this patent is extended or adjusted under 35 U.S.C. 154(b) by 850 days.

(21) Appl. No.: 13/262,989

(22) PCT Filed: Apr. 7, 2010

(86) PCT No.: PCT/GB2010/050605
§ 371 (c)(1),
(2), (4) Date: Oct. 5, 2011

(87) PCT Pub. No.: WO2010/116190
PCT Pub. Date: Oct. 14, 2010

(65) Prior Publication Data
US 2012/0023918 A1 Feb. 2, 2012

(30) Foreign Application Priority Data

Apr. 7, 2009 (EP) .................................. 09157533

(51) Int. Cl.
*F04B 7/02* (2006.01)
*F04B 7/00* (2006.01)
(Continued)

(52) U.S. Cl.
CPC ................. *F04B 7/0076* (2013.01); *B60K 6/12* (2013.01); *F04B 49/06* (2013.01); *B60K 1/02* (2013.01); *Y02T 10/6208* (2013.01)

(58) Field of Classification Search
CPC ...... F04B 7/0266; F04B 53/102; F04B 49/06; F04B 7/0076; F15B 13/043; B60K 6/12
USPC ............................................. 91/271, 275, 461
See application file for complete search history.

(56) References Cited

U.S. PATENT DOCUMENTS

| 6,276,317 B1* | 8/2001 | Yoeda et al. ................ 123/90.11 |
| 2006/0039795 A1* | 2/2006 | Stein et al. ......................... 417/1 |

(Continued)

FOREIGN PATENT DOCUMENTS

| CN | 1973133 | 5/2007 |
| EP | 0361927 | 4/1990 |

(Continued)

*Primary Examiner* — Nathaniel Wiehe
*Assistant Examiner* — Abiy Teka
(74) *Attorney, Agent, or Firm* — Lowe Hauptman & Ham, LLP

(57) ABSTRACT

A fluid working machine comprises a working chamber of cyclically varying volume, a high pressure manifold, and an actuated high pressure valve for regulating the flow of fluid between the working chamber and the high pressure manifold. The actuated high pressure valve comprises a moveable valve member, operable between a closed position and at least one open position. A controllable opening mechanism provides an active urging force to urge the moveable valve member from the said closed position towards at least one said open position, the volume of the working chamber varying between a maximum volume and a minimum volume. The controllable opening mechanism provides the active urging force more than once while the volume of the working chamber is intermediate the maximum of chamber volume and the minimum of chamber volume.

14 Claims, 7 Drawing Sheets

(51) Int. Cl.
  *B60K 6/12* (2006.01)
  *F04B 49/06* (2006.01)
  *B60K 1/02* (2006.01)

(56) References Cited

U.S. PATENT DOCUMENTS

2006/0118346 A1  6/2006  Rampen et al.
2007/0079809 A1* 4/2007  Oono ........................... 123/456
2007/0258832 A1  11/2007 Caldwell et al.

FOREIGN PATENT DOCUMENTS

| | | | |
|---|---|---|---|
| EP | 0494236 B1 | * | 12/1995 |
| EP | 1537333 | | 6/2005 |
| GB | 2430246 A | * | 3/2007 |
| JP | 57-033278 | | 2/1982 |
| JP | 2005538299 | | 12/2005 |
| WO | 2006109079 | | 10/2006 |
| WO | WO 2008012558 A2 | * | 1/2008 |

* cited by examiner

FLUID WORKING MACHINE AND METHOD OF OPERATING A FLUID WORKING MACHINE

RELATED APPLICATIONS

The present application is a National Phase of International Application Number PCT/GB2010/050605, filed Apr. 7, 2010 and claims priority from, British Application Number 09157533.2, filed Apr. 7, 2009.

FIELD OF THE INVENTION

The invention relates to the field of fluid working machines for driving rotatable shafts, particularly those with electronically controlled commutating valves.

BACKGROUND TO THE INVENTION

Fluid working machines include fluid-driven and/or fluid-driving machines, such as pumps, motors, and machines which can function as either a pump or as a motor in different operating modes. Although the invention will be illustrated with reference to applications in which the fluid is a liquid, such as a generally incompressible hydraulic liquid, the fluid could alternatively be a gas.

When a fluid working machine operates as a pump, a low pressure manifold typically acts as a net source of fluid and a high pressure manifold typically acts as a net sink for fluid. When a fluid working machine operates as a motor, a high pressure manifold typically acts as a net source of fluid and a low pressure manifold typically acts as a net sink for fluid. Within this description and the appended claims, the terms "high pressure manifold" and "low pressure manifold" refer to manifolds with higher and lower pressures relative to each other. The pressure difference between the high and low pressure manifolds, and the absolute values of the pressure in the high and low pressure manifolds will depend on the application. A fluid working machine may have more than one low pressure manifold and/or more than one high pressure manifold.

Fluid working machines are known which comprise a plurality of working chambers of cyclically varying volume, in which the displacement of fluid through the working chambers is regulated by electronically controllable valves, on a cycle by cycle basis and in phased relationship to cycles of working chamber volume, to determine the net throughput of fluid through the machine. The net displacement of fluid also determines the torque applied to the fluid working machine's shaft. For example, EP 0 361 927 disclosed a method of controlling the net throughput of fluid (and therefore the torque) through a multi-chamber pump by opening and/or closing electronically controllable poppet valves, in phased relationship to cycles of working chamber volume, to regulate fluid communication between individual working chambers of the pump and a low pressure manifold. As a result, individual chambers are selectable by a controller, on a cycle by cycle basis, to either displace a predetermined fixed volume of fluid or to undergo an idle cycle with no net displacement of fluid, thereby enabling the net torque of the pump to be matched dynamically to demand. EP 0 494 236 developed this principle and included electronically controllable poppet valves which regulate fluid communication between individual working chambers and a high pressure manifold, thereby facilitating the provision of a fluid working machine functioning as either a pump or a motor in alternative operating modes. EP 1 537 333 introduced the possibility of part cycles, allowing individual cycles of individual working chambers to displace any of a plurality of different volumes of fluid to better match demand. Such machines are called synthetically commutated fluid working machines, including the type known as a Digital Displacement pump/motor (Digital Displacement is a trade mark of Artemis Intelligent Power Limited).

Such fluid working machines are particularly useful in transmission systems, especially those for vehicles, and especially so-called 'hybrid' vehicles. US 2006/0118346 and WO 2006/055978 disclosed a number of layouts for transmissions incorporating synthetically commutated fluid working machines and also incorporating one or more fluid accumulators for energy storage. These transmissions are efficient because they can recover kinetic energy when the vehicle slows, then use the energy to accelerate the vehicle again some time later. WO 2008/012558 further disclosed a transmission and method of operation that requires only one high pressure side and one low pressure side, as well as eliminating the need for a precharge pump on the low pressure side, by operating in some modes directly from a reservoir at atmospheric pressure.

GB 2,430,246 (Stein) and EP 08164003.9 (Stein) both disclose two-stage valve assemblies which are suitable for regulating the supply of fluid from a high-pressure manifold to a working chamber of a synthetically commutated fluid working machine. The valve assemblies comprise a primary valve, a secondary valve, an electromagnet and an armature (referred to as a moving pole). The primary valve comprises a face-seating primary valve member and a primary valve seat. The secondary valve is integral to the primary valve and includes a secondary valve member which is moveable between a sealing position and an open position in which a path is provided through the secondary valve for fluid to flow between opposite sides of the primary valve member to reduce the pressure difference across the primary valve member. Thus, the secondary valve, which has a much smaller surface area than the primary valve, can be opened even when there is a substantial pressure difference across the primary valve member. The working chamber is effectively a closed volume, and so fluid can flow through the secondary valve to equalise the pressure on either side of the primary valve member, thereby facilitating the opening of the primary valve.

One problem of the two-stage valve assemblies is that the pressure in the working chamber must be made sufficiently high for the primary valve to be open, because of the limited force available from the armature. The length of time this takes depends on a number of variables such as high pressure manifold pressure, fluid temperature and working chamber leakage. Because of the uncertainty in these and other parameters, the opening operation of the primary valve has been found to be not reliable in some circumstances, causing the machine to operate incorrectly.

It is an object of the invention to provide an improved method of operating a fluid-working machine incorporating a two-stage valve assembly according to the prior art, so as to improve the reliability of the primary valve opening.

A further problem with fluid working machines operated by valve assemblies when they are applied to transmission systems is that the rapid application of pressure within the working chamber(s) due to the valve assembly opening leads to a sudden uncontrollable shaft rotation, where the shaft of the fluid working machine is connected to a typical load, especially one with the non-linear compliance known as 'hysteresis' or 'backlash', such as a transmission. The shaft may move too rapidly and uncontrollably in one direction, creating noise, excessive wear, mechanical fatigue, shock and discomfort for example.

It is therefore a further object of the invention to provide an improved method of operating a fluid working machine, incorporating a valve assembly, with a compliant load, for example a transmission such as a vehicle transmission, so as to control or limit the initial movement of the shaft when the valve assembly is actuated.

A further problem with transmission systems incorporating fluid working machines operated by valve assemblies is that the previously known methods of operating fluid working machines require the transmission system to adjust the pressure of the high pressure fluid source to accurately control the output torque at low or zero rotational speed, because it is only possible to have working chambers which are either fully-enabled or not enabled at all. Adjusting the fluid source pressure may not be possible, especially when a fluid accumulator is more or less directly connected to the fluid working machine, or may require additional components or energy transformations, increasing system cost or decreasing energy efficiency.

It is therefore a further object of the invention to provide an improved method of operating a fluid working machine incorporating a valve assembly, so as to control the torque applied to the shaft of the fluid working machine, at least when rotating at a slow speed.

SUMMARY OF THE INVENTION

According to a first aspect of the present invention there is provided a method of operating a fluid working machine, the fluid working machine comprising a working chamber of cyclically varying volume, a high pressure manifold, and an actuated high pressure valve for regulating the flow of fluid between the working chamber and the high pressure manifold, the actuated high pressure valve comprising a moveable valve member, operable between a closed position in which the actuated high pressure valve seals the working chamber from the high pressure manifold and at least one open position in which the working chamber is in fluid communication with the high pressure manifold through the actuated high pressure valve, and a controllable opening mechanism operable to provide an active urging force to urge the moveable valve member from the said closed position towards at least one said open position, the volume of the working chamber varying between a maximum volume and a minimum volume, the method characterised in that the controllable opening mechanism provides the active urging force more than once while the volume of the working chamber is intermediate a maximum of chamber volume and a minimum of chamber volume.

Surprisingly we have found that operating the fluid working machine by repeatedly urging the movable valve member, while the working chamber volume lies between either of the maximum or minimum volumes, confers new and desirable benefits to the fluid working machine, causing it to operate more reliably, or more controllably, or more smoothly, compared to the prior art in which the moveable valve member is urged just once. This is unexpected because in the prior art only one urging was found to be necessary to open the valve, and it was thought to be impossible to obtain the benefits of controllability or smoothness. It is not obvious to urge the valve member multiple times because doing so is more difficult, and consumes more power, and because the benefits just described do not obviously follow from multiple urging.

It may be that the controllable opening mechanism provides the active urging force to urge the moveable valve member from the closed position towards at least one open position more than once while the working chamber volume expands from the minimum to the maximum volume.

By a maximum of working chamber volume and a minimum of working chamber volume we refer to the largest and small volumes of the working chamber during a cycle of working chamber volume, for example, the first cycle of working chamber volume when a fluid working machine is started or a subsequent cycle of working chamber volume while the fluid working machine is operating. A working chamber may have more than one possible maximum volume or more than one possible minimum volume in different operating modes.

Preferably, the fluid working machine is also operated at other times in at least one additional operating mode, whereby the controllable opening mechanism actively urges the moveable valve member from the closed position towards at least one open position only once while the working chamber volume lies between but does not reach either of the maximum or minimum volumes. The additional operating modes may be activated for example when the rotatable shaft of the fluid working machine is rotating above or below a certain speed or has rotated more than a certain angular distance from a first angle, or when the fluid pressure in the high pressure manifold is within certain ranges, or when the fluid pressure in the high pressure manifold is controlled by another device in communication with the fluid working machine, or when the desired behaviour of the fluid working machine can be more advantageously achieved by the additional operating mode.

The fluid working machine is preferably a synthetically commutated fluid working machine, for example a Digital Displacement pump/motor. Preferably the fluid working machine also has controllable low pressure valves connecting each of several working chambers to one or more low pressure manifolds. Preferably the additional operating mode comprises a cycle-by-cycle operating mode, whereby the fluid working machine is operated so as to actively control the high pressure valve, and optionally one or more low pressure valves, in phased relation to cycles of working chamber volume, to determine the net displacement of the fluid by the or each working chamber on a cycle by cycle basis, to thereby determine the time averaged net displacement of fluid by the working machine or one of more groups of the working chambers, on at least some cycles of working chamber volume. The fluid working motor may function only as a motor. Alternatively, the fluid working motor may function as a motor or a pump in one or more alternative operating modes.

Preferably, the working chamber is a piston-in-cylinder working chamber. Preferably the cycles of working chamber volume are mechanically coupled to the rotation of a rotatable crankshaft. A fluid working machine may contain a plurality of working chambers, each of whose volume is determined by the angular position of the same rotatable crankshaft. The volume of each working chamber varies between a maximum and minimum volume determined by the angular position of the rotatable crankshaft. The maximum and minimum volume of each working chamber may be the same as or different to that of other working chamber. The maximum and minimum working chamber volumes may occur once each revolution of the rotatable crankshaft, or more than once.

Preferably, the fluid working machine is operated so that the fluid pressure in the high pressure manifold exceeds the pressure of the fluid in the low pressure manifold by at least 1 Bar, 20 Bar or 100 Bar in operation.

It may be that the active urging force provided by the controllable opening mechanism is provided for more than one active urging period, intermediate a maximum of chamber volume and a subsequent minimum of chamber volume. The controllable opening mechanism may also provide a background urging force outside the active urging periods. Preferably the maximum active urging force is at least twice, but even more preferably at least three times or at least five times, the minimum background urging force provided outside the active urging periods.

Preferably the fluid working machine is operated so that the fluid pressure in the high pressure manifold is higher than that of the fluid in the working chamber, for example by at least 1 Bar, at least 20 Bar, or at least 100 Bar.

There may also be provided a closing mechanism for urging the moveable valve member from an open position to the closed position. The closing mechanism may be a controllable closing mechanism operated by electronic control. The controllable opening mechanism and closing mechanism may be the same.

The controllable opening mechanism and/or the closing mechanism might include an energy storage device such as a mechanical spring, compressed fluid volume or the weight of the moveable valve member or some other part. Preferably the controllable opening mechanism and/or any controllable closing mechanism is operated by electronic control. The controllable opening mechanism and/or a controllable closing mechanism may actively urge the moveable valve member by the application of electrical stimulation, or the removal of electrical stimulation, or by a particular type of electrical stimulation. The controllable opening mechanism and/or controllable closing mechanism may comprise an electromagnet and an armature, rigidly or compliantly coupled to the moveable valve member.

It may be that where the controllable opening mechanism comprises an electromagnet and an armature, the time between each of the more than one active urging periods is at least as long as the electrical time constant of the electromagnet.

By closed position is meant that the moveable valve member prevents fluid from passing between the high pressure manifold and the working chamber. By open position is meant that the moveable valve member does not prevent fluid from passing from the high pressure manifold and the working chamber. Preferably a closed position means that the moveable valve member is in sealing contact with a valve seat formed in the high pressure valve or the fluid working machine. Preferably the contact between the moveable valve member and the valve seat is an annular ring, preferably forming a face sealing valve. Preferably an open position means that the moveable valve member is spaced apart from the valve seat. The movement of the valve member between the closed and an open position is along a valve member movement path, which is preferably linear or in a straight line. The valve member movement path is preferably perpendicular to the plane of the valve seat, or nearly perpendicular, for example greater than 50, 60, 70, 80 or 90 degrees from the plane of the valve seat. The valve movement path may be the same for each movement of the moveable valve member or it may be different in different conditions.

Preferably the controllable opening mechanism is operated so as to actively urge the moveable valve member from the closed position towards at least one open position for a predetermined period of time and repeating the urging at a predetermined frequency, while the working chamber volume lies between but does not reach either of the maximum or minimum volumes. For example the active urging action might happen for at least 1 ms, 2 ms, 5 ms or 10 ms at a time, might happen for no more than 1 ms, 2 ms, 5 ms or 10 ms at a time, or might be repeated at least once, twice, five times, 10 times or 20 times a second.

Preferably the urging force of the controllable opening mechanism moves the moveable valve member from the closed to at least one open position at least once while the working chamber volume lies between but does not reach either of the maximum or minimum volumes. It may be that the active urging force, which is repeatedly present, does not move the moveable valve member every time the controllable opening mechanism is operated, or it may be that the active urging force does move the moveable valve member every time the controllable opening mechanism is operated.

Preferably, the moveable valve member also moves from the closed to at least one open position when the fluid pressure within the working chamber exceeds the fluid pressure within the high pressure manifold.

Preferably the actuated high pressure valve further comprises a pilot valve which is moveable between a closed position and at least one open position in which a path is provided through the high pressure valve for fluid to flow between opposite sides of the moveable valve member to reduce the pressure difference across the moveable valve member. Preferably the sealing area of the pilot valve when in its closed position is much less than the sealing area of the moveable valve member, preferably less than a twentieth or a hundredth of the sealing area of the moveable valve member. Preferably the pilot valve is urged from its closed towards the open position by a pilot valve opening mechanism. Preferably at least part of the pilot valve opening mechanism is the same as at least part of the opening mechanism that urges the moveable valve member from its closed to an open position. The actuated high pressure valve may further comprise a compliant coupling between any of the pilot valve, moveable valve member and the opening mechanisms of the moveable valve member or the pilot valve. Preferably the pilot valve is coupled to the moveable valve member. Preferably the pilot valve is integral to the moveable valve member and includes a pilot valve member. The pilot valve member may seal against a part of the moveable valve member, and/or may move coaxially with the valve movement path of the moveable valve member.

The fluid working machine is preferably operated so that, at least when the working chamber is made into effectively a closed volume, the pilot valve is moved from a closed to at least one open position by the active urging of the controllable opening mechanism. Preferably, fluid flows through the pilot valve to equalise the pressure on either side of the moveable valve member. Preferably, the moveable valve member itself is opened when the pressure equalises on either side of the moveable valve member. Preferably, the working chamber is made into an effective closed volume by the closure of the controllable low pressure valves. Preferably, pressure in the working chamber (and possible other working chambers) causes the shaft to rotate, and both the pilot valve and the moveable valve member are closed before the working chamber volume reaches a maximum.

Preferably, the fluid working machine is operated so that the pressure difference between the high pressure manifold and the working chamber is such that the active urging force exerted on the moveable valve member by the opening mechanism, when the moveable valve member is in the closed position, is insufficient to open the moveable valve member against the pressure difference, but the force exerted on the pilot valve by the opening mechanism is sufficient to open the pilot valve against the pressure difference, in at least some operating conditions.

Preferably the active urging force of the controllable opening mechanism moves at least the pilot valve from its closed position to at least one open position at least once while the working chamber volume lies between but does not reach either of the maximum or minimum volumes.

It may be that the fluid working machine is operated so that the active urging force from the controllable opening mechanism proportionally controls the rate of fluid flow through the pilot valve and/or the movable valve member, by which we mean that a continuous adjustment of the fluid flow rate is possible, under control of the controllable opening mechanism.

To achieve some objects of the invention it may be that the fluid working machine further comprises one or more sensors. Preferably the fluid working machine is operated so that the duration or frequency of the active urging action by the controllable opening mechanism changes in response to the one or more said sensors.

One or more said sensors may be a working chamber volume sensor. The working chamber volume sensor may be a sensor detecting the angle of the rotatable shaft, which determines the volume of one or more working chambers. The frequency or duration of the active urging action may increase or decrease as the working chamber volume changes towards maximum volume, or the frequency or duration of the active urging action may increase or decrease as the working chamber volume changes towards minimum volume. The frequency or duration of the active urging action may increase or decrease as the rate of change of working chamber volume increases or decreases.

One or more said sensors may be a pressure sensor, sensing the fluid pressure within one or more of the working chamber, high pressure manifold or low pressure manifold. It may be that the fluid working machine is operated so that duration or frequency of the active urging action by the controllable opening mechanism changes in response to one or more of the pressure sensors, especially a high pressure manifold pressure sensor. The frequency or duration of the active urging action may increase or decrease as the fluid pressure sensed by the pressure sensors increases or decreases. The frequency or duration of the active urging action may increase or decrease as the rate of change of fluid pressure sensed by the pressure sensors.

One or more said sensors may be a valve position sensor, which senses the position of the or each actuated high pressure valve and/or the or each controllable low pressure valve. It may be that the fluid working machine is operated such that the duration or frequency of the active urging action by the controllable opening mechanism changes in response to one or more of the valve position sensors, for example a high pressure valve position sensor. The frequency or duration of the active urging action may increase or decrease as the sensed valve is sensed to be in an open position. The frequency or duration of the active urging action may increase or decrease the rate of change of valve position, or sensed acceleration of the valve.

It may be that the fluid working machine further comprises one or more working fluid viscosity sensors, for example, a working fluid temperature sensor. It may be that the fluid working machine is operated so that the duration or frequency of the active urging action changes in response to sensed or estimated fluid viscosity. The frequency or duration of the active urging action may increase or decrease as the viscosity decreases.

It is possible that more than one of the sensed fluid pressure, sensed working chamber volume and sensed valve position affect the duration and frequency of the active urging action.

Typically, the active urging force is a force arising from the magnetic force applied to an armature operably linked to the moveable valve member by an electromagnet responsive to the flow of current through the electromagnet To achieve some objects of the invention it is preferable that the controllable opening mechanism can provide a background urging force that urges the moveable valve member in the direction of the at least one open position from the closed position, but with less force than the active urging force described above. By less force is meant less than half, ideally less than one fifth and even more ideally less than one tenth of the active urging force would generate when the valves were in the same position between the at least one open position and the closed position. Preferably, the background urging force holds the moveable valve member in at least one open position, in operation. It may be that the background urging force does not open the pilot valve in operation. The controllable opening mechanism could provide the background urging force by the use of Pulse Width Modulation (PWM) of the urging force. The PWM of the urging force could be at a rate higher than the repetition rate of the active urging force (if any), for example five times, 10 times or 20 times the frequency of the active urging force. It may be that where the controllable opening mechanism comprises an electromagnet and an armature, the PWM of the urging force could be at a rate higher than the electrical time constant of the electromagnet, for example five times, 10 times or 20 times the time constant of the electromagnet.

It may be that the fluid working machine is operated so that the controllable opening mechanism provides the background urging force in between at least some of the more than one times the controllable opening mechanism actively urges the moveable valve member from the closed position towards at least one open position. The background urging force may start before the first active urging force or may start after it; the background urging force may finish after the last active urging force or may finish before it. The background urging force preferably starts and finishes while the working chamber volume lies between but does not reach either of the maximum or minimum volumes, but may extend beyond this time.

According to a second aspect of the present invention there is provided a fluid working machine comprising a fluid working machine controller, a working chamber of cyclically varying volume, a high pressure manifold, and an actuated high pressure valve for regulating the flow of fluid between the working chamber and the high pressure manifold, the actuated high pressure valve comprising a moveable valve member, operable between a closed position in which the actuated high pressure valve seals the working chamber from the high pressure manifold and at least one open position in which the working chamber is in fluid communication with the high pressure manifold through the actuated high pressure valve, and a controllable opening mechanism operable to provide an active urging force to urge the moveable valve member from the said closed position towards at least one said open position, the volume of the working chamber varying between a maximum volume and a minimum volume, the method characterised by the controller having an operating mode in which the controllable opening mechanism is caused by the controller to provide the active urging force more than once while the volume of the working chamber is intermediate a maximum of chamber volume and a minimum of chamber volume.

The fluid working machine controller is an electronic controller capable of operating the machine in accordance with any of the methods just described. The electronic controller may operate by executing computer software comprising program code which, when executed on a fluid working machine controller, causes the controller to carry out any parts of the method just described. The controller may have one or more operating modes in which the controllable opening mechanism is caused to provide the active urging force more than once while the volume of the working chamber is intermediate a maximum of chamber volume and a minimum of chamber volume and one or more operating modes in which the controllable opening mechanism is caused to provide the active urging force more than once while the volume of the working chamber is intermediate a maximum of chamber volume and a minimum of chamber volume or the controller may only have one or more operating modes in which the controllable opening mechanism is caused to provide the active urging force more than once while the volume of the working chamber is intermediate a maximum of chamber volume and a minimum of chamber volume.

There may be a plurality of actuated high pressure valves operating from a plurality of high pressure manifolds (or just one high pressure manifold). There may be several working chambers associated with each of some actuated high pressure valves, for example in the manner disclosed in WO2006/109079.

Further optional features of the fluid working machine of the second aspect of the invention correspond to those described above in relation to the first aspect of the invention.

The invention also extends in a third aspect to a transmission system comprising a fluid working machine according to the second aspect of the invention, a controller to operate the fluid working machine, a high pressure fluid source in fluid communication with the said high pressure manifold, a low pressure fluid sink, a rotational output, and one or more rigid and/or non-rigid links between the fluid working machine and the rotational output. A non-rigid link may be one or more torsionally compliant (including non-linear compliant) components such as driveshafts, gearboxes, gearsets, differentials, tyres, tracks and/or clutches, arranged in series or parallel.

According to a fourth aspect of the present invention there is provided computer software comprising program code which, when executed by a computing device, causes the computing device to operate a fluid working machine by the method of the first aspect.

The computer software may be stored on a computer readable carrier.

DESCRIPTION OF AN EXAMPLE EMBODIMENT

An example embodiment of the present invention will now be illustrated with reference to the following Figures in which:

FIG. 1A-D shows an actuated high pressure valve;

Figure 1:
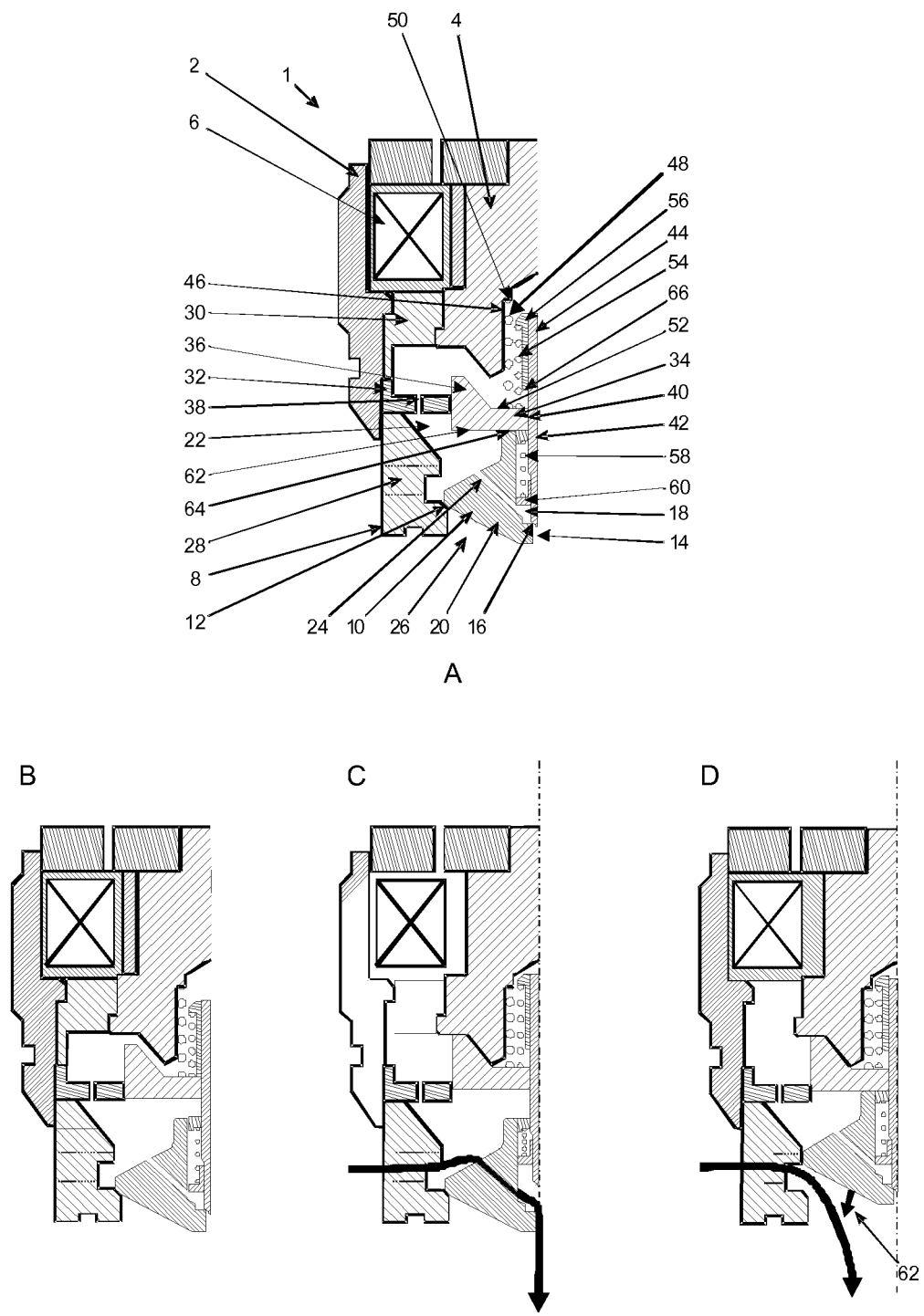

With reference to FIGS. 1A through 1D, an actuated high pressure valve 1 has an annular valve housing 2, which encompasses a body portion 4, both made from a magnetically permeable material. An electromagnet 6 and pole 46 (together functioning as the controllable opening mechanism) is formed around the body portion. An annular poppet cage 8 extends from the valve housing and encompasses a primary poppet valve head 10 which functions as the moveable valve member. In a closed position, the primary poppet valve head mates with the primary valve seat 12 to form a seal, biased towards the closed position by the main spring 48 acting on the armature 36.

Figure 2:
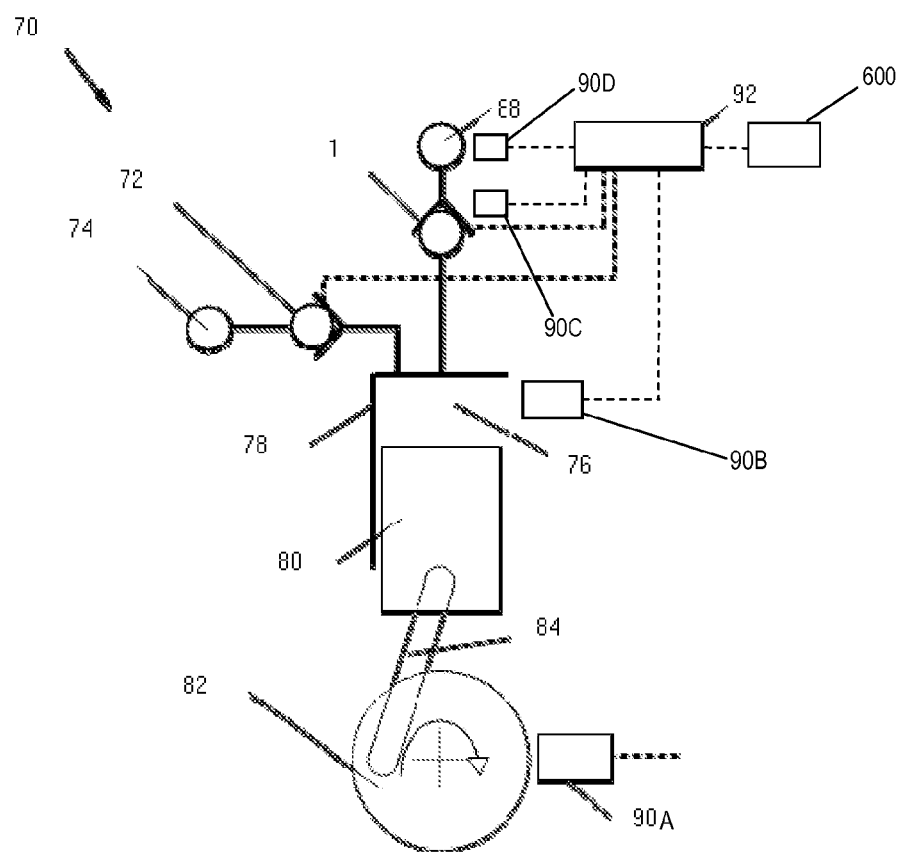
FIG. 2 shows a fluid working machine.

The valve assembly is located within a fluid working machine 70 shown in FIG. 2, with the inlet connected to a high pressure manifold 88, and the outlet attached to a piston 80 and cylinder 78 creating a working chamber 76. The piston is driven by a rotating shaft 82 by a connecting rod 84. The electromagnet 6 is switchable under the control of a controller 92 to enable current to be supplied to the electromagnet when required. The controller synchronises current pulses with cycles of working chamber volume taking into account signals from the shaft position sensor 90A, the fluid viscosity sensor 90B, the valve position sensor 90C, and the high pressure manifold pressure sensor 90D. The controller is also able to actively close and allow to open a low pressure valve 72 connected to a low pressure manifold 74. A non-transitory computer readable recording medium 600 stores computer software including program code which is executed on the controller 92 to cause the fluid working machine to operate as herein described.

Figure 3:
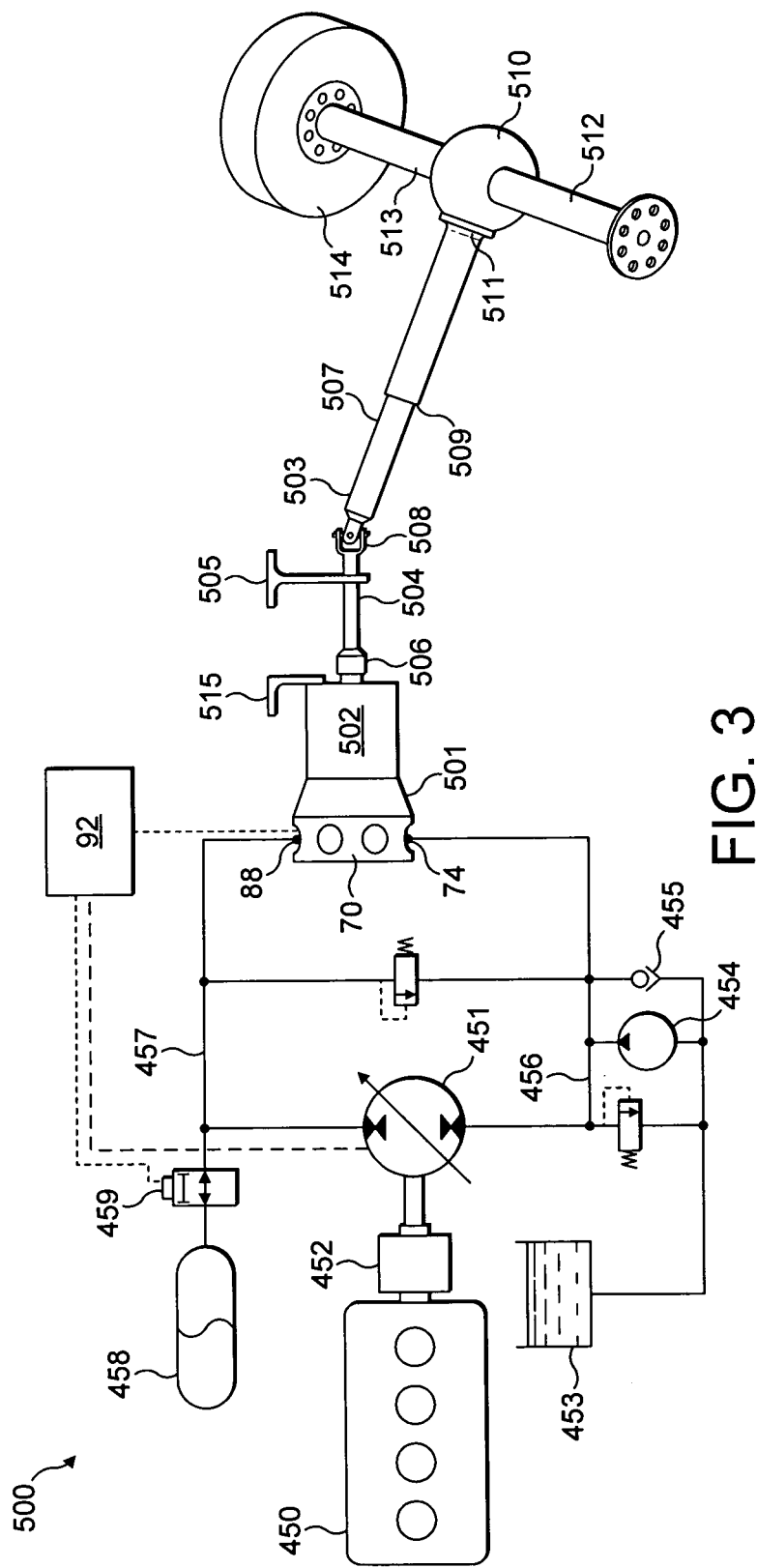
FIG. 3 shows a transmission system incorporating a fluid working machine, for example in a tractor.

The fluid working machine 70 is located within a transmission system 500 shown in FIG. 3. The transmission includes an engine 450 driving a hydraulic pump/motor 451 through a reduction gearset 452. The hydraulic pump/motor takes fluid from a low pressure side 456, itself fed by a reservoir 453 through a charge pump 454 and/or a check valve 455. The hydraulic pump/motor can pressurise or depressurise a high pressure line 457 which itself feeds a fluid accumulator 458 through a controllable blocking valve 459, and the fluid working machine 70. The shaft of the fluid working machine (not shown) is connected via a bell housing 501 to a gearbox 502. The gearbox and fluid working machine are supported by at least one semi-rigid engine mount 515. The gearbox drives a driveshaft 503 whose first section 504 is supported by a driveshaft bearing 505 and driven by a first spline 506, and whose second section 507 is driven from the first by a universal joint 508 and includes an expanding spline 509. The second driveshaft section drives a differential 510 through a driving flange 511, the differential then driving a left half shaft 512 and a right half shaft 513, each respectively driving a left tyre (not shown) and a right tyre 514. In an alternative embodiment or an alternative operating condition, the transmission operates in the opposite direction with the tyres driving the differential, which in turn drives the second driveshaft section, which in turn drives the first driveshaft section, which first draftshaft section drives the gearbox. In practical systems the driveshaft and tyres have a measurable amount of torsional elastic compliance, and the gearbox, first spline, universal joint, expanding spline and differential all have measurable amounts of torsional mechanical hysterisis known as 'backlash' or 'slop'. Together the compliance and hysterisis have the effect that it is possible for the fluid working machine's shaft to rotate some noticeable angle, for example 10 degrees to 90 degrees, without any tyre rotation and without requiring significant torque on the fluid working machine's shaft, especially when the direction of rotation changes.

Returning to FIG. 1, the primary poppet valve head includes a secondary valve seat 14, against which a secondary valve member 20 (acting as the pilot valve) is biased, so that the second valve is biased towards a closed position. The sealing area of the secondary valve is around a hundredth of the sealing area of the primary valve. Only when the secondary valve member is not in sealing contact with the secondary valve seat can fluid flow between the outlet 26 of the valve and the interior chamber 22, and therefore allow fluid from the inlet into the working chamber. A path is also provided for fluid to flow directly from the inlets to the outlet when the primary poppet valve is open, irrespective of whether the secondary valve is open, and this path offers a much higher flow rate than the path through the secondary valve, due to its much larger area.

The valve assembly comprises three springs. The main spring 48 extends around the secondary valve member and is in compression throughout operation. A charge spring 54 also extends around the secondary valve member, and drives the secondary valve to open when compressed. The secondary valve includes a peripheral flange 44 which itself has an outward surface 66 against which the inward surface 52 of the armature can react, to form a distance limiting mechanism. A pilot spring 58 is relatively relaxed when the valve assembly is in the fully closed state illustrated in FIG. 1A, but is compressed when the secondary valve has opened but the primary valve has not opened, illustrated in FIG. 1O, urging the primary valve open.

When no current is supplied to the electromagnet, the valve adopts the closed position illustrated in FIG. 1A. The net force on the rigid stem due to the preload within the charge spring and the pilot spring seals the secondary valve. The primary valve and secondary valve are also retained in the closed positions by the pressure differential between the internal chamber of the valve assembly and the outlet, and the closing action of the main spring acting through the armature.

When current is supplied to the electromagnet, the electromagnet exerts an attractive force (functioning as the active urging force) on the armature sufficient to move the armature upwards. The elastic coupling allows the armature to move initially without movement of the secondary valve member (FIG. 1B). The armature contacts the outward surface of the peripheral flange, opening the secondary valve (acting as the pilot valve) and creating a small path for fluid to flow into the cylinder (FIG. 1O). If the flow through of fluid is sufficient or long enough to build pressure in the cylinder equal to or close to that in the inlet, the primary poppet valve opens to allow a relatively unrestricted through flow of fluid (FIG. 1D).

Figure 4:
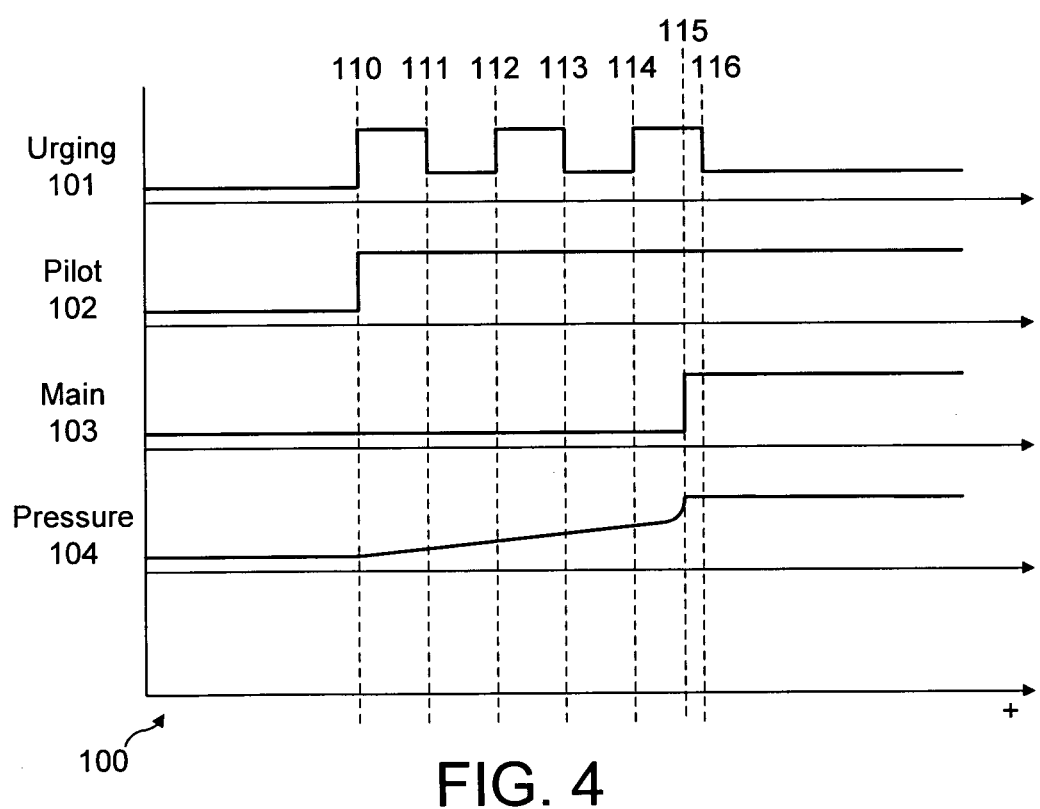
FIG. 4 shows a method of reliably opening an actuated high pressure valve in a fluid working machine, where the working chamber is pressurised only slowly.

FIG. 4 shows a method of operating the fluid working machine of FIG. 2 so as to more reliably open the valve than was possible before the present invention, when the valve has a very small secondary valve or large working chamber so that the working chamber takes a long time to pressurise. A time series 100 shows the urging force 101 created by the electromagnet, the position of the secondary valve 102 (low being closed, high being open), the position of the main valve 103 (low and high as before), and the pressure in the cylinder 104.

Before time 110 the valve and fluid working machine is at rest, with the low pressure valve closing the path from the cylinder to the low pressure manifold. At time 110 the controller energises the electromagnet to create the active urging force which opens the secondary valve. Pressure in the high pressure manifold (and valve inlet) is high enough to hold the primary valve head closed, so the primary valve fails to open (corresponding to the valve state shown in FIG. 10). However, the cylinder pressure rises as a small amount of fluid flows through the secondary valve. At time 111 the electromagnet power is reduced using Pulse Width Modulation (PWM), to function as the background urging force. The secondary valve stays open and pressure continues to rise, despite the valve having failed to open fully. Between time 112 and time 113 the electromagnet is fully energised again, but the pressure difference is still too high. After energising it at time 114, however, the cylinder pressure is close enough to the valve inlet pressure that the primary valve head moves when the urging force is fully developed (time 115, corresponding to the valve state of FIG. 1D), and the now unrestricted fluid flow causes the pressure to jump to the full inlet pressure. At time 116 the energising power is again reduced, but the primary valve head stays open.

Figure 5:
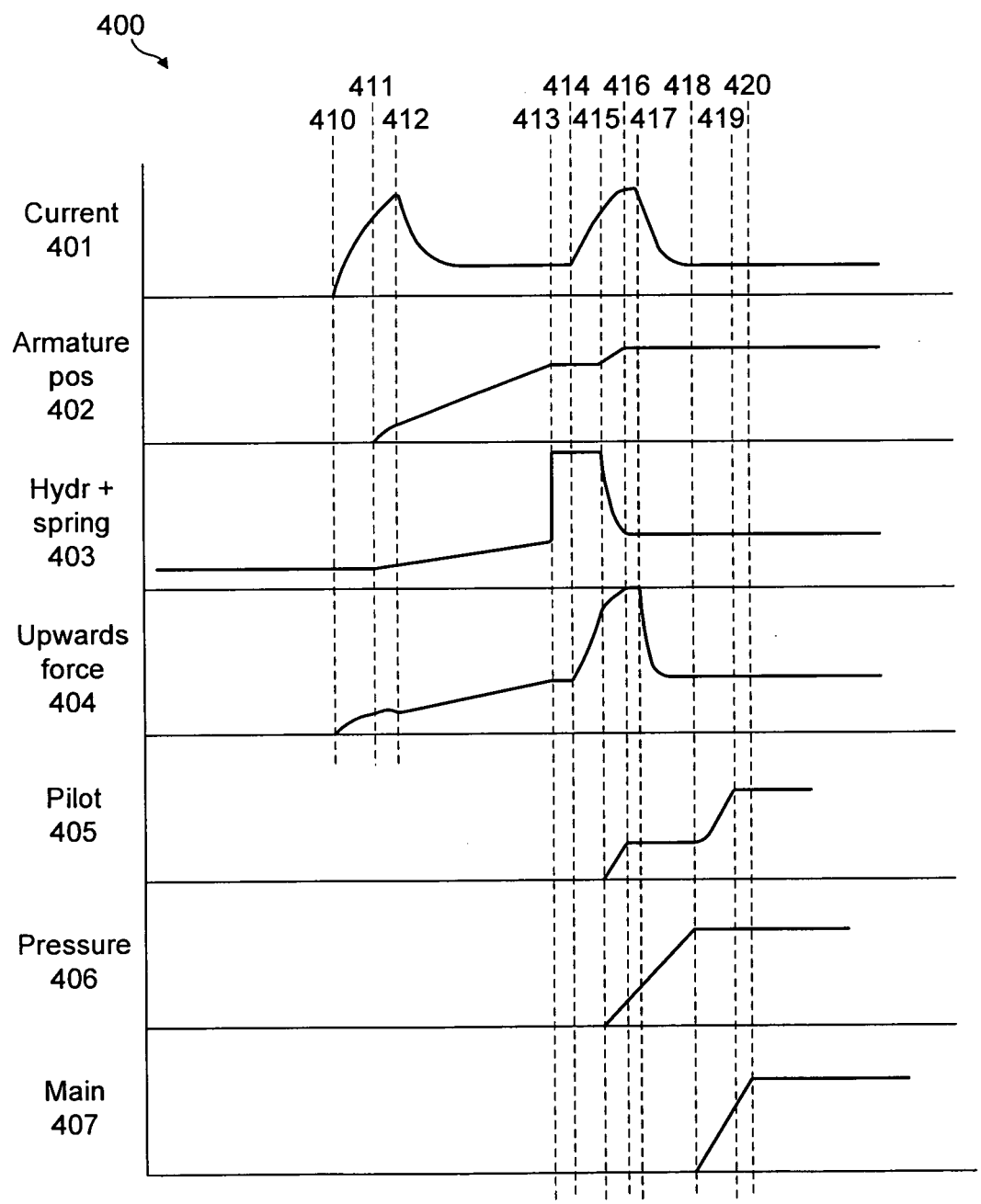
FIG. 5 shows a method of reliably opening an actuated high pressure valve in a fluid working machine, where the actuated high pressure valve movement is slowed by friction or damping.

FIG. 5 shows a method of operating the fluid working machine of FIG. 2 so as to more reliably open the valve than was possible before the present invention, where the secondary valve and/or armature movement is fluidly or frictionally damped. A time series 400 shows the current 401 in the electromagnet 6, the position of the armature 36 (low being down, high being up, when the valve is oriented as in FIG. 1), the downwards force 403 on the armature from all of the outward facing surface 66 and the three springs, the upwards force 404 on the armature from the electromagnet, the secondary valve member position 405, the working chamber pressure 406 and the primary poppet valve head position 407.

Before time 410 the valve and fluid working machine is at rest as shown in FIG. 1A, with a downwards bias force on the armature 36 from the three springs 48, 54 and 58, a high pressure at the inlet 28 and a low pressure at the outlet 26. Despite the pressure difference across the valve there is no hydraulic force applied to the armature, because the secondary valve member 20 is in contact with the seat 16, which takes the hydraulic force. At time 410 the controller energises the electromagnet to create an upwards force on the armature, acting as the active urging force. The force rises as the electromagnet current increases. Once the upwards force exceeds the combined spring forces at time 411, the armature begins to move, compressing the main spring 48 and the charge spring 54. As the armature moves, the downward force from the springs increases. However, the upwards force also increases as the magnetic circuit efficiency increases, due to the reducing gap between the pole and the armature. In moving, the armature overcomes fluid damping forces (not shown) caused by fluid escaping from between the armature and the pole, and friction forces due to the sliding of the armature through the flux bridge. Therefore providing a high urging force at this time would waste energy because damping and friction forces dissipate more energy if the urging is strong. At time 412 the electromagnet is changed to a PWM mode, which causes the current to fall (acting as the background urging force), but the upwards force on the armature continues to exceed the downwards spring forces, causing the armature to move slowly. At time 413 the inward surface 52 of the armature hits the outward surface 66 of the peripheral flange 44 and the armature stops moving, because the hydraulic force sealing the secondary valve member is transferred to the armature. At time 414 the electromagnet is reenergised, causing an increase in current and therefore upwards force. Because the armature does not have to move far and it is in an efficient position close to the pole, the large upwards force overcomes the hydraulic force plus the spring forces at time 415, moving the final distance to press against the pole by time 416, and opening the secondary valve a small distance. The electromagnet can be returned to the PWM mode to maintain the secondary valve partially open, at time 417. The working chamber pressure rises as fluid flows thereto, and the hydraulic force sealing the secondary valve falls rapidly. When the pressure across the valve equalises at time 418, the secondary valve member is urged fully open (time 419) by the charge spring 54, and the primary poppet valve head opens by time 420.

From the above descriptions referencing FIGS. 4 and 5, it can be seen that it is not simply repeated attempts at urging the valve open that ultimately cause it to open, but the intervening periods of background urging that cause the cylinder pressure to rise over time, or the armature to move against friction and fluid damping without needless expenditure of energy. The background urging keeps power consumption down while maintaining the secondary valve open or the armature moving towards the pole. The only way to achieve the equalised cylinder pressure and the full armature movement, according to the teachings of the prior art, is to maintain the full urging force for a very long time, typically 15 or more milliseconds. This consumed a lot of power and may even have damaged the electromagnet, compared to the method of the invention, where pulses of typically 4 milliseconds can be used.

Figure 6:
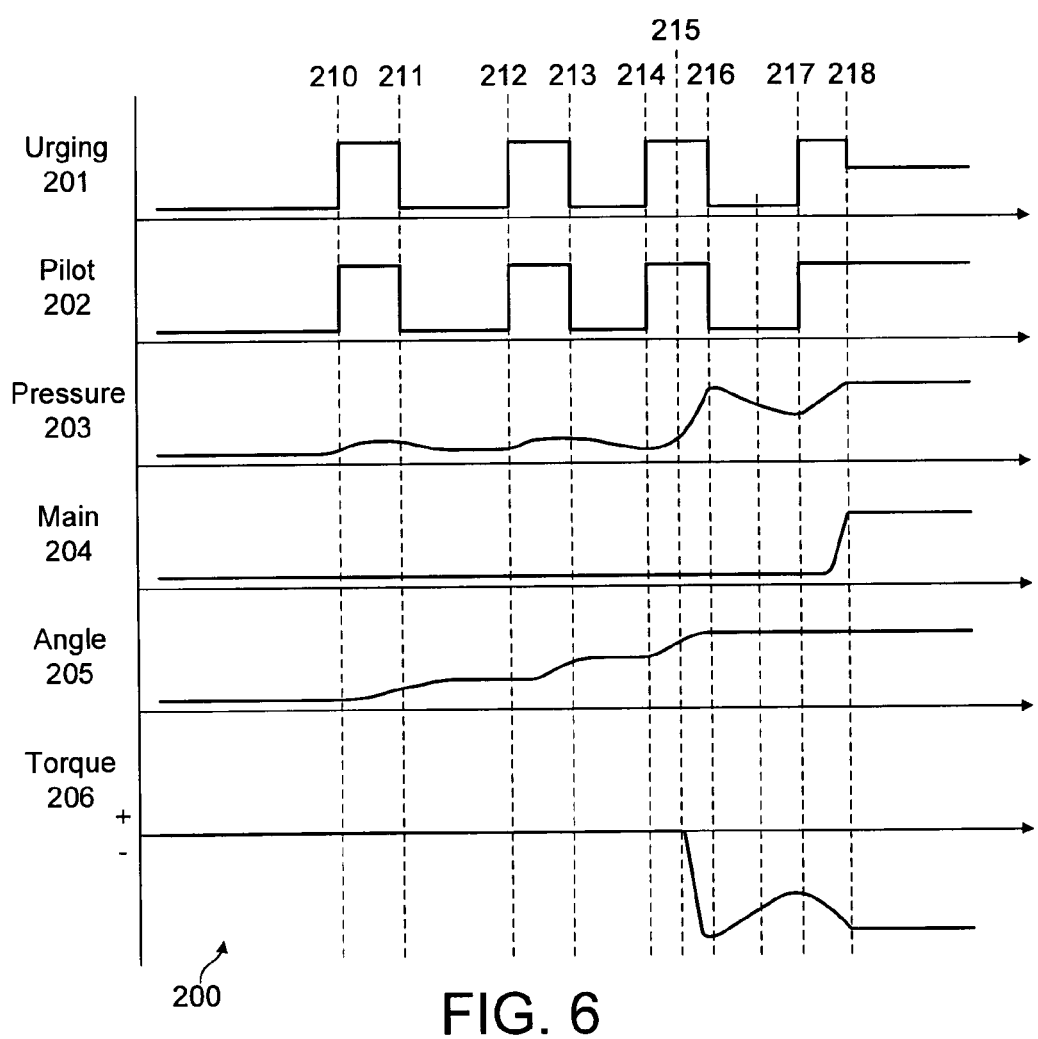
FIG. 6 shows a method of gently taking up slack in a transmission system incorporating a fluid working machine.

FIG. 6 shows a method of operating the transmission system in FIG. 3 so as obtain a smoother shaft movement than was possible without the present invention. A time series 200 shows the urging force 201 created by the electromagnet, the position of the secondary valve 202 (low being closed, high being open), the pressure in the cylinder 203, the position of the main valve 204 (low and high as before), the angle of the shaft 205 and the torque applied to the shaft by the piston 206.

Before time 210 the high pressure valve and shaft are at rest, the low pressure valve closes the path from the cylinder to the low pressure line, and the fluid accumulator is changed with fluid which pressurises the high pressure line through the open blocking valve and therefore the high pressure valve inlet. At time 210 the controller energises the electromagnet to open the secondary valve. Pressure in the high pressure line holds the primary valve head closed. Fluid flowing from the fluid accumulator through the secondary valve causes the shaft to rotate freely without raising very much pressure in the cylinder, because the hysteresis of the transmission system components means that very little torque is required to initially rotate the fluid working machine's shaft. At time 211 the electromagnet is deenergised, the cylinder pressure falls and the shaft may stop rotating. After deenergising, the electromagnet may for a short time generate a continuing closing force (functioning as the background urging force) due to the built up current. This process is repeated between times 212 and 213. A controller monitoring the shaft rotation through a shaft sensor decides between times 213 and 214 that the shaft rotation is not fast enough, so it increases the frequency of the electromagnet energising—i.e. the gap between times 214 and 213 is less than the gap between times 211 and 212. The controller could also have increased the duration of the energising pulses, or if the shaft rotation was too fast it could have reduced the duration or frequency of the energising pulses. The controller may also be configured to know properties of the transmission system, so as to be able to create the right energising pulses without reference to the shaft position sensor. At time 215 the hysterisis is taken up and the torque on the fluid working machine's shaft increases rapidly, in the opposite direction to the shaft rotation (i.e. to oppose the rotation). The cylinder pressure rises until the valve is closed at time 216, after which the pressure slowly falls due to unavoidable leakage, between the piston and cylinder for example. The next time the controller opens the valve at time 217 the rise in cylinder pressure is sufficient to open the primary valve. Between times 217 and 218 the controller detects that the shaft is not moving and only provides a shorter pulse ending at time 218, then energises the electromagnet using PWM (functioning as the background urging force) to maintain the primary valve open. The cylinder pressure then stays at the high pressure manifold pressure.

In contrast to the fluid working machine operating method disclosed in the prior art, the short opening bursts of the secondary valve mean that the shaft rotates relatively slowly to take up the 'backlash' or 'slop' in the transmission system, reducing the shock and noise when the 'backlash' or 'slop' is completely taken up. This can have the advantage of increasing lifetime of the transmission system, including the fluid working machine.

Figure 7:
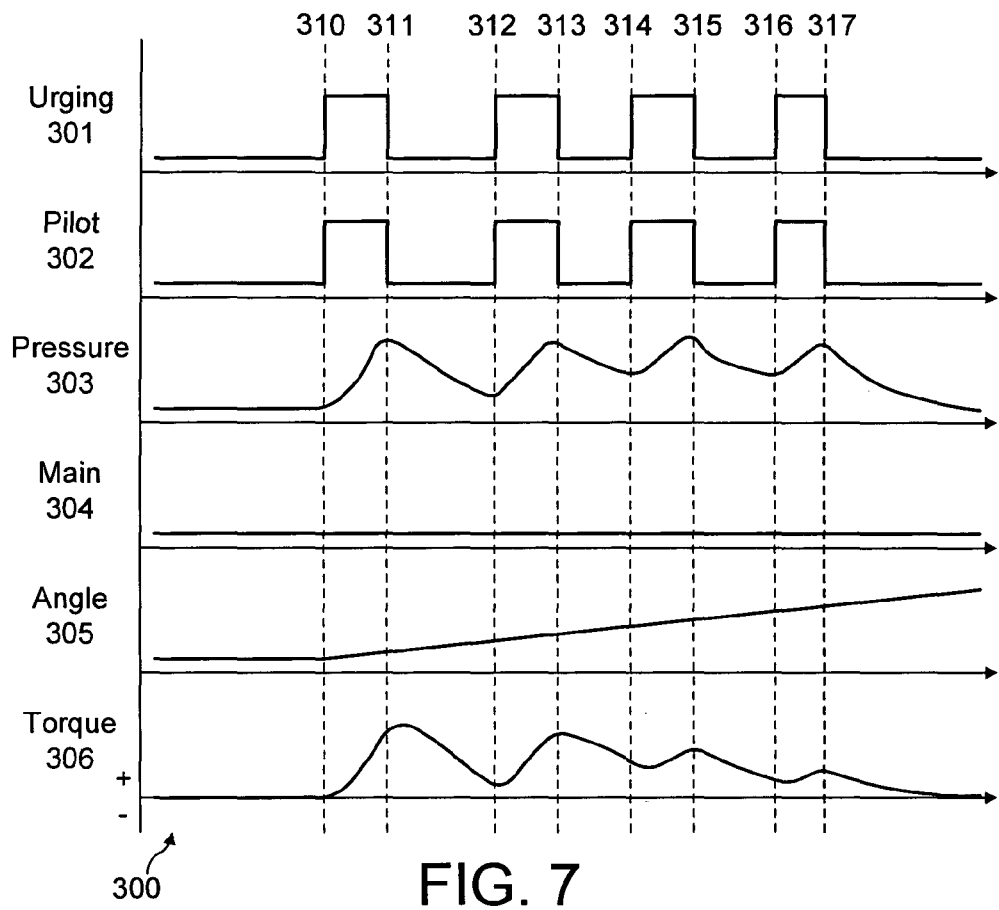
FIG. 7 shows a method of modulating the shaft torque in a fluid working machine or transmission system.

FIG. 7 shows a method of operating the transmission system in FIG. 3 so as modulate the shaft torque when stationary, which was not possible without the present invention. A time series 300 shows the urging force 301 created by the electromagnet, the position of the secondary valve 302 (low being closed, high being open), the pressure in the cylinder 303, the position of the main valve 304 (low and high as before), the angle of the shaft 305 which is rotating with a constant, low, speed, and the torque applied to the shaft by the piston 306.

Before time 310 the valve and shaft are at rest, with the low pressure valve providing a fluid path from the cylinder to the low pressure manifold, and the fluid accumulator is changed with fluid which pressurises the high pressure line through the open blocking valve and therefore the high pressure valve inlet. At time 310 the controller energises the electromagnet to open the secondary valve, as well as closing the low pressure valve (not indicated). Pressure in the high pressure line holds the primary valve head closed. Fluid flowing from the fluid accumulator through the secondary valve raises pressure in the cylinder, so that the piston causes a proportional torque on the shaft. At time 311 the electromagnet is deenergised, the cylinder pressure falls and the torque falls. This process is repeated between times 312 and 313. A controller monitoring the shaft rotation through a shaft sensor, or the tyre rotation through another sensor (not shown) decides between times 313 and 314 that the time averaged shaft torque is not high enough (for example the tyre rotation is too slow), so it increases the frequency of the electromagnet energising—i.e. the gap between times 314 and 313 is less than the gap between times 311 and 312. The controller could also have increased the duration of the energising pulses, or if the tyre rotation was too fast it could have reduced the duration or frequency of the energising pulses. If the high pressure valve had been a type that allowed proportional control of the fluid flow through the secondary valve by adjusting the intensity of the energising pulses, the controller could have increased or decreased the intensity of the energising pulses to allow more or less fluid into the cylinder. Note that the shaft torque is gradually falling compared to the cylinder pressure because the mechanical advantage of the piston on the fluid working machine's shaft will change (in this example, reducing) as the shaft rotates. The controller continues to modulate the time averaged shaft torque by causing energising pulses between times 316 and 317, after which it decides (by knowing the shaft angle) that the piston is not suitable for use anymore. At that time it could use one or more different cylinders in the same way, or use a different operating method (for example those given in the prior art) to maintain the desired tyre torque.

In contrast to the fluid working machine operating method disclosed in the prior art, the repeated opening of the secondary valve allows the controller to modulate or control the torque on the shaft provided by individual cylinders, without the necessity to control the pressure in the high pressure manifold. For example the controller can control the tyre torque while the high pressure manifold of the fluid working machine is connected to the accumulator.

Figure 8:
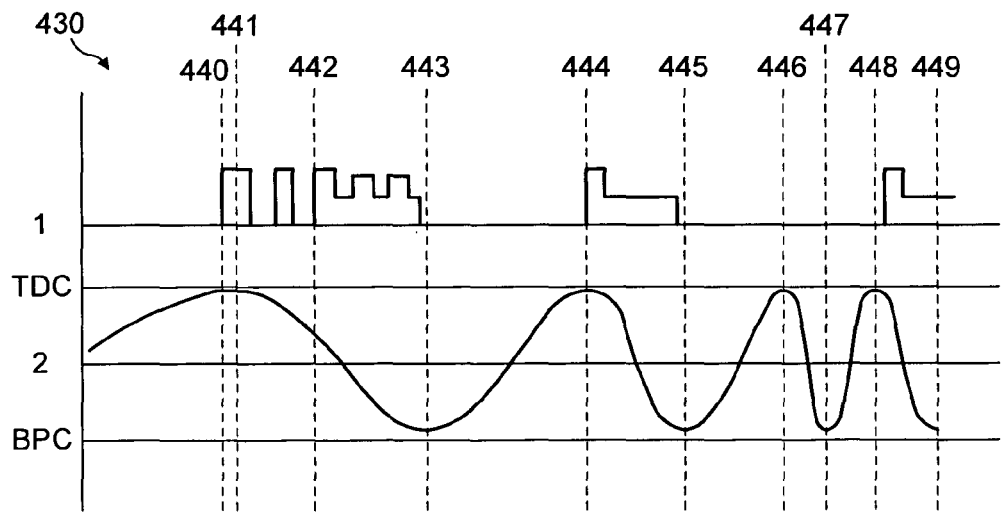
FIG. 8 shows a method of operating a fluid working machine in two operating modes.

FIG. 8 shows a method of operating the fluid working machine of FIG. 2 whereby there is an additional mode in which the high pressure valve is opened only once a revolution. A time series 430 shows the electromagnet activation 431 and working chamber volume 432 for one working chamber, the working chamber volume expanding between Top Dead Centre (TDC, acting as the minimum volume) and Bottom Dead Centre (BDC, acting as the maximum volume) and contracting in the rising parts of the curve.

Before time 440 the machine's shaft is rotating, but the working chamber is idle, i.e. with low pressure valve open and high pressure valve closed to isolate the working chamber from the high pressure manifold. At time 440, just before TDC at time 441, the electromagnet (acting as the active urging force) attempts to open the high pressure valve, and may indeed open it to allow some fluid into the working chamber, for example to modulate the pressure in the working chamber. This happens again before time 442, and between that time and time 443 PWM (acting as the background urging force) is used between two more full electromagnet actuations. Thus the fluid working machine is operated in the manner of the current invention. Between time 443 (BDC) and time 444 (TDC) the high pressure valve is not actively urged open, though it may be open passively if the low pressure valve is held closed deliberately or accidentally, and the working chamber exhausts fluid to the high pressure manifold. After time 444, another TDC, the high pressure valve is again urged open, but, in the manner of the prior art it is only urged open this one time before reaching the BDC point at time 445. Between time 445 and time 446 (yet another TDC), no urging is carried out, but more interestingly between time 446 and time 447 (yet another BDC), also, no urging is carried out. This behaviour corresponds to the method of operating a fluid working machine with cycle-by-cycle working chamber activation disclosed in the prior art, and may continue indefinitely. Together the periods of cylinder expansion with one urging or with no urging (i.e. cycle-by-cycle activation) act as the additional operating mode. Of course the fluid working machine may return to the operating mode of multiple urging at any time.

Further variations and modifications may be made within the scope of the invention herein disclosed.

The invention claimed is:

1. A method of operating a fluid working machine, the fluid working machine comprising a working chamber of cyclically varying volume, a high pressure manifold, and an actuated high pressure valve for regulating the flow of fluid between the working chamber and the high pressure manifold, the actuated high pressure valve comprising a moveable valve member, operable between a closed position in which the actuated high pressure valve seals the working chamber from the high pressure manifold and at least one open position in which the working chamber is in fluid communication with the high pressure manifold through the actuated high pressure valve, and a controllable opening mechanism operable to provide an active urging force to urge the moveable valve member from said closed position towards at least one said open position, the volume of the working chamber varying between a maximum volume and a minimum volume, the method comprising:

actively urging the movable valve member from said closed position towards at least one said open position by the controllable opening mechanism that provides the active urging force more than once while the volume of the working chamber is intermediate the maximum of chamber volume and the minimum of chamber volume during a cycle of working chamber volume.

2. A method of operating a fluid working machine according to claim 1, wherein cycles of working chamber volume are mechanically coupled to rotation of a rotatable crankshaft.

3. A method of operating a fluid working machine according to claim 1, wherein the active urging force is active for the duration of an active urging period, the controllable opening mechanism providing at least two said active urging periods, and the controllable opening mechanism provides a background urging force outside the active urging periods, wherein the maximum active urging force is at least twice the minimum force of the background urging force.

4. A method of operating a fluid working machine according to claim 1, wherein the fluid working machine has an additional operating mode in which the controllable opening mechanism urges the moveable valve member from the closed position towards at least one open position only once while the working chamber volume is intermediate the maximum of chamber volume and the minimum of chamber volume.

5. A method of operating a fluid working machine according to claim 1, wherein the pressure of the fluid in the high pressure manifold is higher than that of the fluid in the at least one working chamber at least when the active urging force is active.

6. A method of operating a fluid working machine according to claim 1, wherein the controllable opening mechanism actively urges the moveable valve member for a predetermined period of time and repeats the active urging at a predetermined frequency.

7. A method of operating a fluid working machine according to claim 1, wherein the active urging force of the controllable opening mechanism moves the moveable valve member from the closed position to at least one open position at least once while the working chamber volume is intermediate the maximum of chamber volume and the minimum of chamber volume.

8. A method of operating a fluid working machine according to claim 1, wherein the actuated high pressure valve further comprises a pilot valve coupled to the moveable valve member, the pilot valve being moveable between a closed position and at least one open position in which the pilot valve is operable to admit fluid into the at least one working chamber from the high pressure manifold when the pilot valve is in the at least one open position, wherein the active urging force of the controllable opening mechanism moves at least the pilot valve from the closed position to at least one open position at least once while the working chamber volume is intermediate the maximum of chamber volume and the minimum of chamber volume.

9. A method of operating a fluid working machine according to claim 1, wherein the fluid working machine further comprises one or more sensors and either or both the duration or frequency of the urging of the controllable opening mechanism is changed in response to the output of the one or more sensors.

10. A method of operating a fluid working machine according to claim 9, wherein the one or more sensors comprises at least one of a pressure sensor for measuring the fluid pressure within the high pressure manifold and/or the working chamber, a working chamber volume sensor, a fluid viscosity sensor, or a valve position sensor for measuring the position of the moveable valve member.

11. A method of operating a fluid working machine according to claim 1, wherein the controllable opening mechanism is also operable to provide a background urging force urging the moveable valve member from the closed position towards at least one open position between the more than one times the controllable opening mechanism urges the moveable valve member from the closed position towards the at least one open position.

12. A fluid working machine comprising:
 a fluid working machine controller,
 a working chamber of cyclically varying volume,
 a high pressure manifold,
 an actuated high pressure valve for regulating the flow of fluid between the working chamber and the high pressure manifold, the actuated high pressure valve comprising a moveable valve member, operable between a closed position in which the actuated high pressure valve seals the working chamber from the high pressure manifold and at least one open position in which the working chamber is in fluid communication with the high pressure manifold through the actuated high pressure valve, and
 a controllable opening mechanism operable to provide an active urging force to urge the moveable valve member from said closed position towards at least one said open position, the volume of the working chamber varying between a maximum volume and a minimum volume,
 wherein the controller has an operating mode in which the controllable opening mechanism is caused by the controller to provide the active urging force more than once while the volume of the working chamber is intermediate the maximum of chamber volume and the minimum of chamber volume during a cycle of working chamber volume.

13. A transmission system comprising a fluid working machine according to claim 12, a controller to operate the fluid working machine, a high pressure fluid source in fluid communication with said high pressure manifold, a low pressure fluid sink, a rotational output, and a non-rigid link between the fluid working machine and the rotational output.

14. A non-transitory computer readable recording medium comprising computer software comprising program code which, when executed on a controller of a fluid working machine, causes the fluid working machine to operate according to the method of claim 1.

* * * * *